United States Patent [19]

Hinzpeter et al.

[11] Patent Number: 5,071,336

[45] Date of Patent: Dec. 10, 1991

[54] ROTARY PELLETING MACHINE

[75] Inventors: Jürgen Hinzpeter; Ulrich Zeuschner, both of Schwarzenbek; Hans-Joachim Pierags, Lübeck; Kurt Marquardt, Hamburg; Ulrich Arndt, Lauenburg; Günter Harten, Schwarzenbek, all of Fed. Rep. of Germany

[73] Assignee: Firma Wilhelm Fette GmbH, Schwarzenbek, Fed. Rep. of Germany

[21] Appl. No.: 577,924

[22] Filed: Aug. 31, 1990

[30] Foreign Application Priority Data

Sep. 9, 1989 [DE] Fed. Rep. of Germany ....... 3930127

[51] Int. Cl.[5] ....................... B29C 43/04; B29C 43/36; B29C 43/58

[52] U.S. Cl. .................................... 425/135; 425/150; 425/345; 425/348 R

[58] Field of Search .................... 425/345, 348 R, 135, 425/145, 344, 136, 150, 169

[56] References Cited

U.S. PATENT DOCUMENTS 3,891,375 6/1975 Pilewski et al. ................ 425/348 R
4,466,605 9/1983 Hand .................................. 425/262

*Primary Examiner*—Willard Hoag
*Attorney, Agent, or Firm*—Michael J. Striker

[57] ABSTRACT

A rotary pelleting machine comprises a housing, a drive shaft, a matrix disc connected with the drive shaft and guiding upper plungers and lower plungers, a unit for controlling position of the plungers during rotation of the matrix disc. The unit includes a cam ring provided for controlling the upper plungers. The cam ring is supported rotatably relative to the housing and the drive shaft. Also a unit for measuring a torque of the cam disc is provided.

8 Claims, 3 Drawing Sheets

ROTARY PELLETING MACHINE

BACKGROUND OF THE INVENTION

The present invention relates to a rotary pelleting machine.

More particularly it relates to such a rotary pelleting machine which has a matrix disc rotatably supported in a housing and connected with a drive shaft, and upper and lower plungers are guided in the matrix disc. Also, the position of the plungers is controlled during rotation of the matrix disc by cams.

In the known rotary pelleting machines the cams are formed as cam rings provided with a ring groove which is formed as a control curve for guiding the plunger heads. The cam rings and the control curves serve for moving vertically the individual plungers during rotation of the matrix disc and the guides of a rotor, or in other words for lifting and lowering the plungers in their axial direction. These movements are however difficult when the plungers and their plunger guides are dirtied by the press material which is pressed from the plungers. These dirtying also includes lubricant which is used for easy movement of the plungers.

Depending on the degree of dirtying of the guides and the plunger, the value of the friction of the plungers and their guides and thereby the loading of the plungers and the safety of the operation of the pelleting machine are varied. It is therefore advantageous to continuously monitor the value of the friction of the plungers, and depending on the obtained results to control the supply of lubricant particularly for the upper plunger. The same is true for the lower plungers, though they are not contaminated as strongly and the lubrication of the lower plungers is simpler, since there is no danger that with a high lubricant supply the lubricant mixes with the product to be pressed. This however takes place when the upper plungers are heavily lubricated.

SUMMARY OF THE INVENTION

Accordingly, it is an object of the present invention to provide a rotary pelleting machine which avoids the disadvantages of the prior art.

More particularly, it is an object of the present invention to provide a rotary pelleting machine in which the friction resistance of the plungers is continuously monitored during rotation of a matrix disc so as to take respective steps in the event of relatively high friction resistance, such as for example provide a timely lubricant supply and thereby to improve the safety of the machine with low costs.

In keeping with these objects and with others which will become apparent hereinafter, one feature of the present invention resides, briefly stated, in a rotary pelleting machine in which the upper plungers are guided in a cam ring rotatably supported relative to the housing and to the drive shaft and provided with a measuring device for measuring its torque.

The invention is based on the fact that the forces which are applied by the plungers during their rotation in the guides act directly on the cam ring and they increase with increase of the friction of the plunger in the guides especially in the openings of the rotor provided for the axial guidance. These forces and thereby the friction resistance which must be overcome by the plungers during their movement can be measured as torque of the cam ring when it is supported rotatably.

In accordance with another feature of the present invention, the cam ring can be connected with a supporting ring located in it, and the supporting ring rolls over the drive shaft and is provided with a lever arm connected with a load cell. The lever arm for example can also be arranged directly on the cam ring. It is important that the cam ring itself is slightly rotatable relative to the housing on the one hand and rotatably supported relative to the drive shaft on the other hand, so that they are not taken along by these parts but instead only by the action of the friction forces.

The inventive solution can be applied in the same manner to the lower plungers. Since however the upper plungers in normal situation must be moved with very low lubricant for avoiding dirtying of the press products by lubricant underneath the upper plungers, the measurement of the friction of the upper plunger is significantly more important than of the lower plungers.

The machine in accordance with the present invention has an important advantage as compared with the known machines in that a measurement of the friction resistance is performed not at one predetermined location of the control curve with respect to throughgoing cam train to measure the problems with individual plunger, but over the whole cam train. There is a possibility to electronically evaluate the measured torque by a computer, and depending on the produced measuring results to control the lubricant supply to the plunger.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
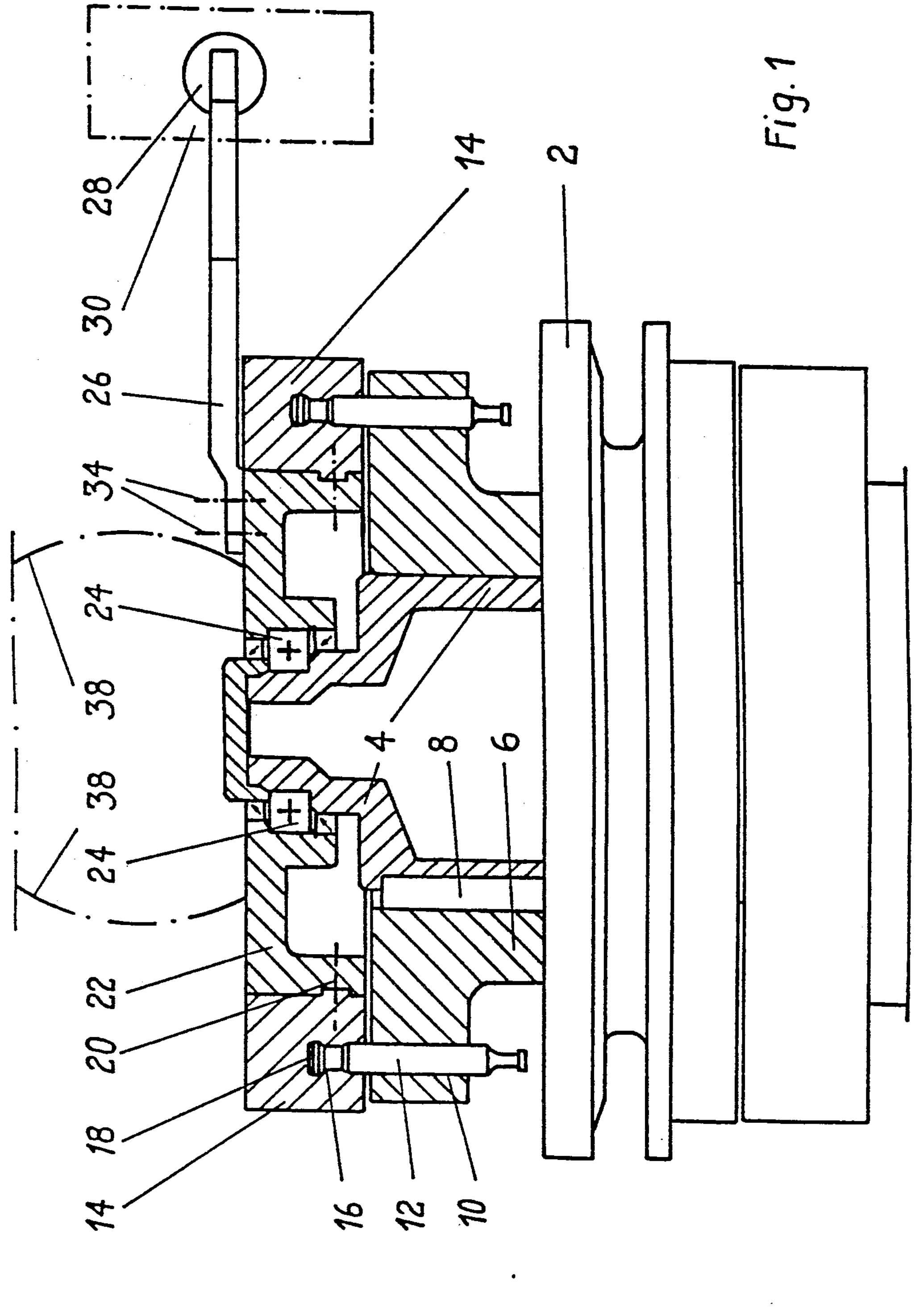
FIG. 1 is a view showing a rotary pelleting machine, on a side view, partially in section.

A rotary pelleting machine shown in the drawings has a rotatably driven matrix disc 2 which is connected with a drive shaft 4. The matrix disc 2 is provided with a plurality of matrices. The matrices are not shown in the drawings and they are uniformly distributed over the periphery. A compression of press material of pellets is performed in the matrices with the lower plungers as well as upper plungers 12. The upper plungers are guided axially displaceably in openings 10 formed in a rotor 6. The rotor is connected by a driver 8 with the drive shaft 4. A cam ring 14 is arranged for height adjustment of the upper plungers 12 during their rotation. The cam ring 14 has a ring-shaped groove 16. It operates as a cam curve for a plunger head 18 and the plunger 12.

Figure 2:
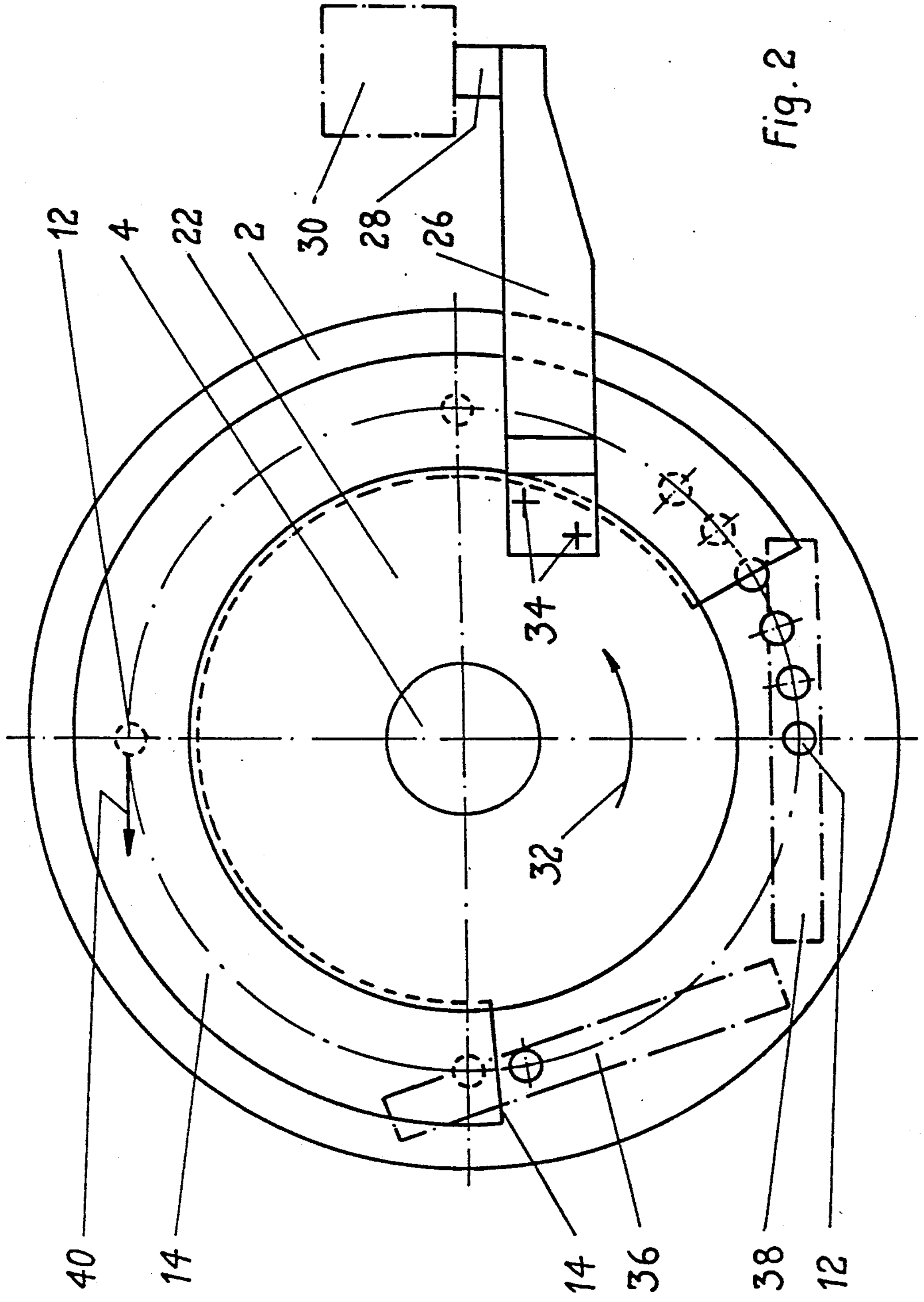
FIG. 2 is a plan view of a rotary pelleting machine in a schematic showing.

The cam ring 14 is formed as a partial ring as can be seen from FIG. 2. A pre-pressing station with a pre-pressing roller 36 and a main pressing station with a main pressing roller 38 are located in the intermediate space between both ends of the cam ring 14. A compression of the press material 2 pellets is performed in these stations first by the pre-pressing roller 36 and then by the main pressing roller 38. The rotation of the matrix disc 2 with the rotor 6 and the plungers 12 in the guides 10 is performed in correspondence with the arrow 32 in FIG. 2 in a counterclock-wise direction.

During the progressing upward and downward movement of the plunger 12 in the openings 10 and the progressing sliding of the plunger head 18 in the ring groove 16, friction forces have to be overcome. They deal especially with dirtying by the pressing material, and in some cases also lubricating medium in the guides. For progressively measuring the value of this friction resistance, the cam rings 14 are connected by screws 20 with a supporting ring 22 which rolls on the drive shaft 4 through a bearing 24. The supporting ring carries a lever arm 26 which extends radially outwardly over the cam ring 14 and cooperates with a load cell 28. The latter is supported on a stationary housing part 30. The lever arm 26 is for this purpose connected with the supporting ring 22 by screws 34.

When a plunger during its movement experiences a stronger friction, a force is applied for overcoming the resistance. This force is shown symbolically by the arrow 40 in FIG. 2. The sum of the resistance forces of all plungers to overcome during the movement of the plungers during the rotation of the matrix disc 2 acts as a torque through the lever 26 on the load cell 28. With this load cell the friction resistance can be measured continuously over the whole curve course of the ring groove 16 corresponding to the control curve, and also the guiding opening 10 in which the plungers 12 move during their rotation.

The continuously determined measuring results can be used also for controlling the supply of lubricant, especially for the openings 10 of the rotor 6, but also for the supply of lubricant agents for the head 18 of the plunger 12. The load cell 28 has for example a known wire strain gauge which supplies a signal to an amplifier 44 for the purpose of further electronic evaluation. The load cell 28 corresponds in principle to a known Wheatstone bridge 42.

Figure 3:
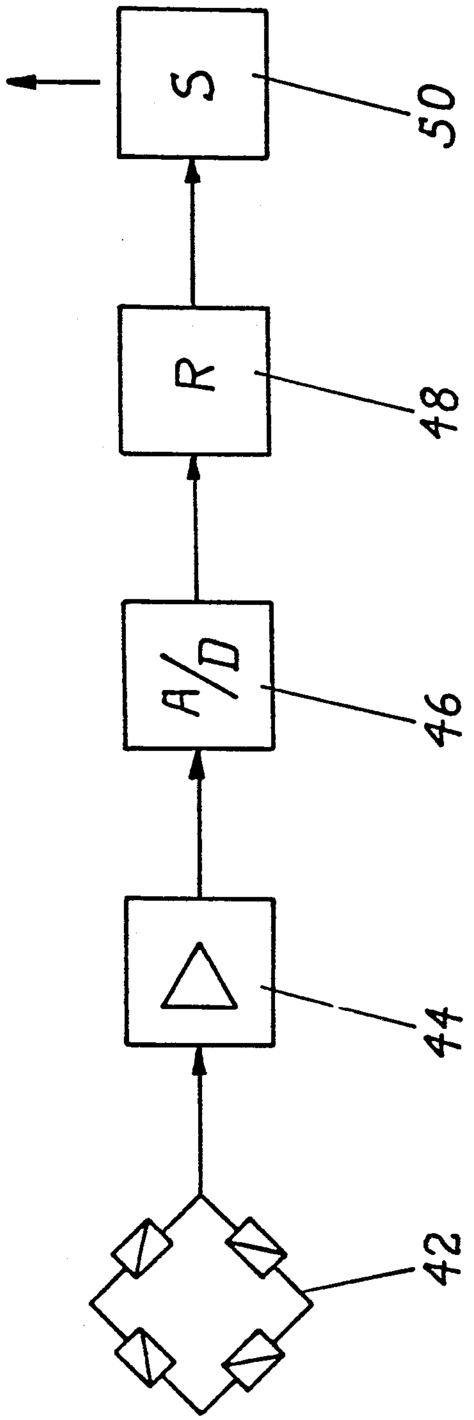
FIG. 3 is a block diagram for evaluation of measuring results.

As shown in FIG. 3, the signal from the amplifier is supplied to an analog/digital converter 46 which sends the digital signal to a computer 48 for performing evaluation. In the event of exceeding an adjustable measuring value, the computer 48 can release a signal through a signal generator 50, so that a supply of lubricant is performed or for example a stoppage of the machine for the purpose of cleaning is commended. There is also a possibility to release an alarm device of optical or acoustic types.

It will be understood that each of the elements described above, or two or more together, may also find a useful application in other types of constructions differing from the types described above.

While the invention has been illustrated and described as embodied in a rotary pelleting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rotary pelleting machine, comprising a housing; a drive shaft; a matrix disc defining mold cavities therein and connected with said drive shaft; upper plungers and lower plungers movable in said cavities in said matrix disc; means for controlling position of said plungers during rotation of said matrix disc, said means including a cam ring provided form controlling said upper plungers, said cam ring being supported rotatably relative to said housing and said drive shaft and having means for measuring torque of said cam ring and thereby measuring friction resistance to said plungers during their guidance in said matrix disc.

2. A rotary pelleting machine as defined in claim 1; and further comprising a supporting ring which is rotatably supported on said drive shaft and connected with said cam ring.

3. A rotary pelleting machine as defined in claim 2, wherein said supporting ring has a lever arm, said measuring means including a load cell connected with said lever arm.

4. A rotary pelleting machine as defined in claim 3, wherein said load cell is provided with a Wheatstone bridge.

5. A rotary pelleting machine as defined in claim 3; and further comprising a main pressing roller, said lever arm being arranged behind said main pressing roller and extending radially outwardly over said cam ring.

6. A rotary pelleting machine as defined in claim 1; and further comprising means for electronically evaluating a measured torque and controlling lubricant supply to said upper plunger.

7. A rotary pelleting machine as defined in claim 6, wherein said electronically evaluating means include a computer.

8. A rotary pelleting machine, comprising a housing; a drive shaft; a matrix disc defining mold cavities therein and connected with said drive shaft; upper plungers and lower plungers movable in said cavities; means for controlling position of said plungers during rotation of said matrix disc, said means including a cam ring provided for controlling said upper plungers, said cam ring being supported rotatably relative to said housing and said drive shaft; means for measuring torque of said cam disc; a supporting ring which si rotatably supported on said drive shaft and connected with said cam ring, said supporting ring having a lever arm, said measuring means including a load cell connected with said lever arm.

* * * * *